July 10, 1962 R. W. McAVOY 3,043,243
DUMP CAR
Filed May 19, 1960 2 Sheets-Sheet 2

INVENTOR
Robert W. McAvoy
BY Townsend and Townsend
Attorneys

United States Patent Office 3,043,243
Patented July 10, 1962

3,043,243
DUMP CAR
Robert W. McAvoy, Oroville, Calif., assignor to
Rua and Swendsen, Inc., Nevada City, Calif.
Filed May 19, 1960, Ser. No. 30,149
2 Claims. (Cl. 105—260)

This invention relates to new and useful improvements in dump cars as, for example, the type generally used for hauling ore, dirt, gravel or the like from a mine or quarry.

More conventional ore railroad side dump cars, of the type with which I am familiar, perform the dumping operation upon actuation of a releasable latch mechanism which permits the entire bed of the car to tilt laterally in the direction of the dump area and unload its contents.

The unloading area for such cars to dump their loads is often located at the top rim of a steep embankment or precipice so that the cars dump their loads down the embankment to a dump area far below. Because more conventional cars of which I am familiar are adapted to discharge their loads only about six (6) inches beyond their wheels, it is necessary to lay the tracks very close to the rim of the precipice below which is located the dump area.

A disadvantage in conventional cars, as described above, is that they exhibit a tendency to overturn and upset due to the sudden shift in the center of gravity of the bed and its contents when the bed is tilted to discharge position—the maximum degree of tilt usually being limited because the bed sharply strikes against some part of the car frame. Many such cars have become lost when they overturn on tracks located very near the rim of a steep precipice.

Another disadvantage in the conventional cars above described is that since the bed is extendable beyond the wheels of the car only about six (6) inches, when discharging its load, the car tracks must be located on the weak, unstable ground proximate the edge of the precipice.

Another disadvantage in such cars is that they employ releasable latch mechanisms adapted to hold the bed and its load against tilting and unloading under force of gravity of the load. Such release mechanisms are dangerous because if they become accidentally unlatched, the contents will prematurely discharge and create a hazardous condition for persons in the vicinity.

In the preferred embodiment of the within invention, there is provided a dump car having a frame support and a box-type bed. The bed includes: fixed, oppositely-disposed vertical end walls or plates; first and second oppositely-disposed side walls (sometimes herein referred to respectively as the rear wall and front wall) and a bottom. The rear or first side wall is hingedly supported adjacent its upper regions between the end walls for swingable movement of the lower regions of the first side wall relative to the end plates inwardly toward the front or second side wall. The second side wall defines a generally vertical, normally closed, movable closure for the second side of the bed.

Additionally provided, is closure means for moving the second side wall from its normal closed position to an open position defining a side discharge opening in the bed through which a load can be dumped. Also, load bearing means supporting the underside of the bottom is included to allow the bottom to move laterally between the end walls toward the second side wall and laterally beyond the discharge opening. The bottom edge of the first side wall is hingedly connected to an adjoining side margin of the bottom, and when the first side wall is swung inwardly toward the second side wall, the side of the bottom hinged thereto elevates to define an inclined plane sloping toward the second side. This swinging inward movement of the first side wall will also cause lateral movement of the outer edge of the sloping bottom toward and beyond the discharge opening.

It is a primary object of the within invention to provide a side dumping car from which the tendency to overturn is virtually eliminated. Accordingly, a dumping car is provdied in which the end walls are rigidly mounted to the frame and only the side walls and bottom plate are movable to dumping position. As the end walls remain stationary during the dumping operation, their weight serves to counterbalance the shifting weight of the movable bed members and the car contents. This counterbalancing function of the end walls stabilizes the car and virtually eliminates its tendency to upset or overturn. Such a tendency is further eliminated by reason of the fact that the bottom plate no longer makes sudden contact with the frame. Instead, the bottom slides along the frame to a laterally projecting downwardly inclined position utilizing the frame as a fulcrum.

It is another primary object of the within invention to provide a dumping car which can extend the bottom plate at least thirty (30) inches beyond the car wheels. This permits the car tracks to be placed as much as thirty (30) inches from the rim of the precipice on relatively firm ground, an additional safety factor in preventing the car from becoming lost. As the bottom plate of the car is hinged along its rear margin to the lower margin of the pivotal rear wall, the rear wall forms an extension of the bottom when the plate is moved to dumping position. In such an arrangement it has been found that the bottom plate will extend approximately twenty-four (24) inches beyond the extension of an equally-dimensioned conventional side dumping car.

Another object of the within invention is to provide a dump car which is not prone to discharge its load accidentally. Accordingly, the car of the within invention is actuated not by a releasable latch mechanism, but by a ram or other means that must exert a positive force against the bed and its load to cause the car to dump.

It is another object of the within invention to adapt the new and useful features of the above described side dump car to road trucks for either rear or side dumping.

A feature and advantage of the invention resides in the fact that since the bottom plate and rear wall are hinged together, they are movable into substantially coplanar relationship. Thus, in the dumping operation, the corner area between the rear wall and bottom plate is converted to an angle of approximately 180 degrees, and wet ore, dirt or the like caked in this area is readily loosened and broken up to permit a "clean" or thorough discharge of the car contents.

Other objects of the invention will become apparent upon reading the following specification and referring to the accompanying drawings in which similar characters of reference represent corresponding parts in each of the several views.

In the drawings:

FIG. 4 is a modification of the within invention and shows a side elevational view of a short bed rear dump truck.

Referring now more particularly to the drawings, in

Figure 1:
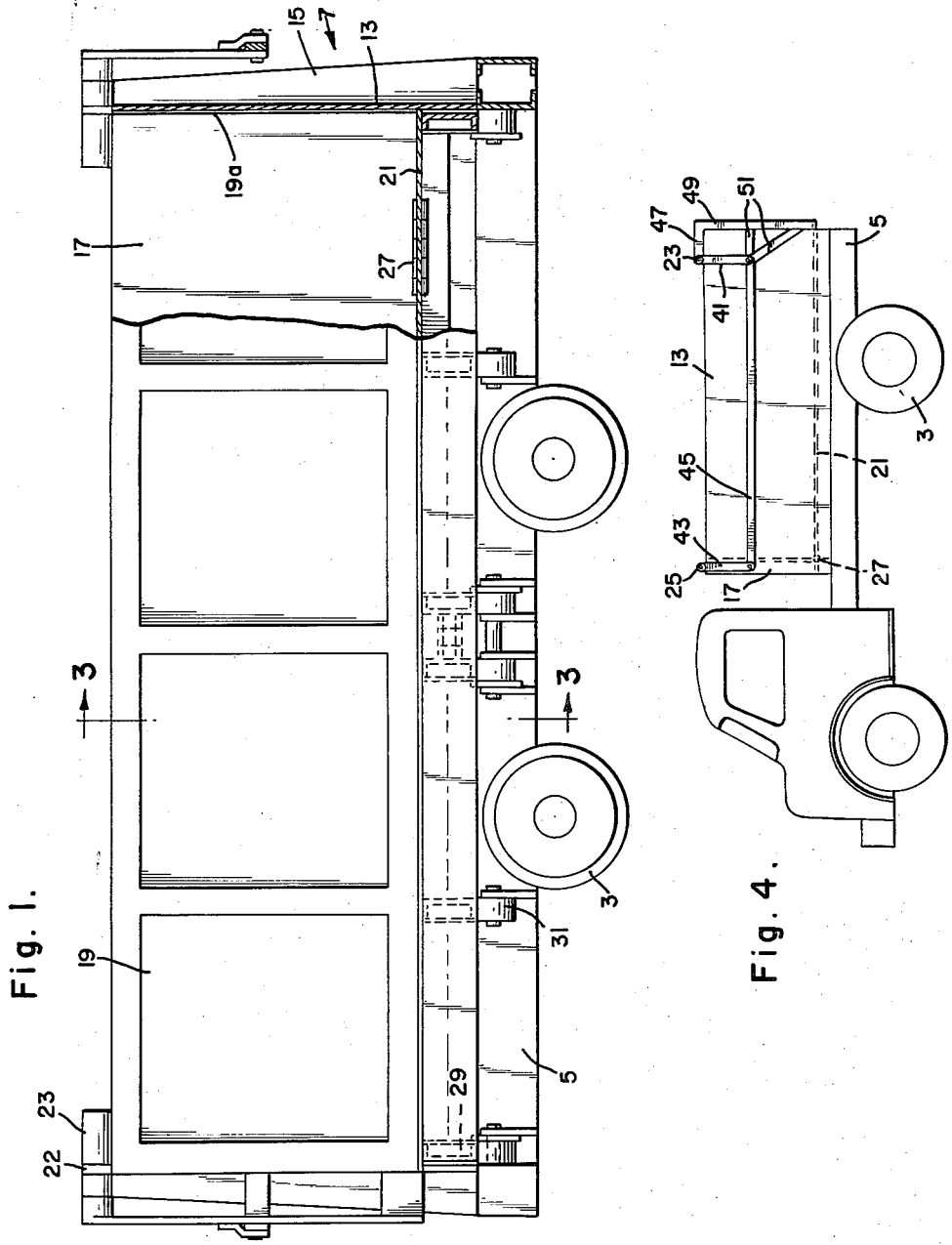
FIG. 1 is a side elevational view, partially broken away, of a side dumping car according to the within invention.
Figure 2:
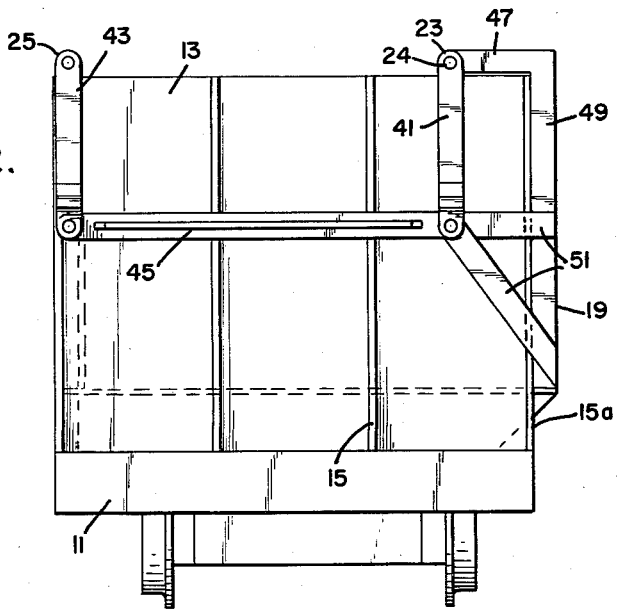
FIG. 2 is an end elevational view of the embodiment of FIG. 1.
Figure 3:
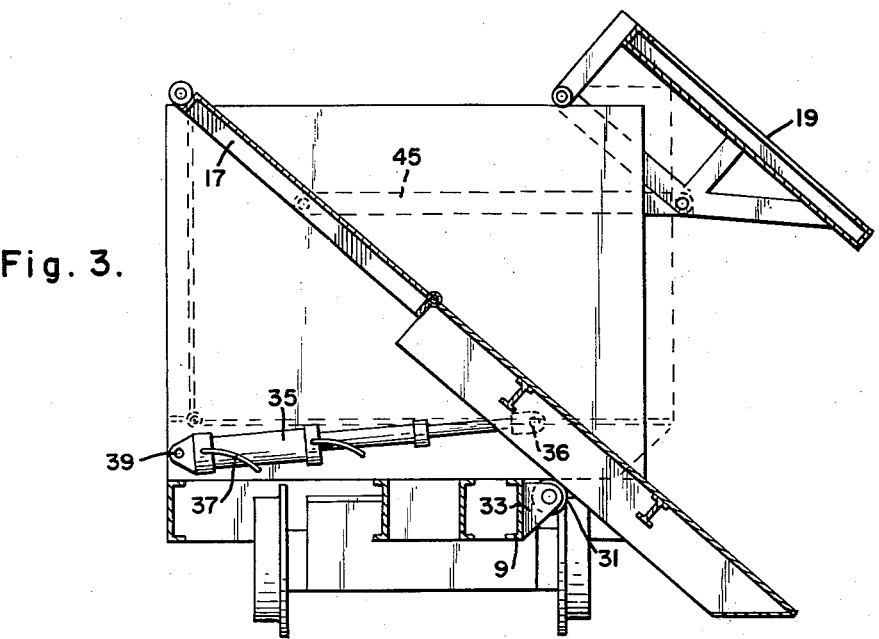
FIG. 3 is an end elevational veiw of the embodiment of FIG. 1 showing the front and rear side walls and bottom plate in dumping position.

FIGS. 1, 2 and 3 there is illustrated a side dump car of the type generally used in mining operations. The car may be dimensioned to have a 5, 6, 8 or 10 cubic yard capacity and is normally constructed from heavy-duty material, such as iron or steel.

Basically, the car includes wheels 3 mounted on a frame 5 and a box-type bed, indicated generally at 7. The frame 5 has a series of longitudinal supports 9 and end supports 11. The upper margin of the frame 5 extends substantially above the upper limits of wheels 3 to support the bed 7.

The bed 7 comprises end walls 13. These walls are provided with a series of spaced-apart ribs 15, and the walls and ribs are rigidly secured at their lower margins to end supports 11. The end walls, being immovable, serve to counterbalance the shifting weight of the movable bed members and load during the dumping operation as will more fully appear.

The bed 7 also includes a first side or rear wall 17, a second side or front wall 19 and a bottom plate 21. Secured to the top margin of the front wall 19 and located at the ends thereof is a rearwardly extending arm 22 supporting a tubular sleeve 23. Rods 24 are welded to the top margins of the end walls and fit loosely into the tubular sleeves 23. The lower margin of the front wall is free and is thus arcuately movable. The rear wall 17 has pivotal means 25 located at opposite ends of its top margin connecting the said wall with the end walls 13 and is movable in the same direction as the front wall 19. A space such as indicated at 19a is provided at opposite ends of the rear wall and the end plates 13 for swingable movement of the wall between the end plates.

Bottom plate 21 and rear wall 17 have adjacent margins hinged together by a plurality of hinges, one of which is seen at 27 in FIG. 1. On the underside of bottom plate 21 there are a series of spaced-apart runners 29 disposed normal to longitudinal supports 9. The runners normally rest on supports 9, and during movement of the bottom plate, the runners engage rollers 31, which are journaled in plates 33 secured to front frame support 9. Thus, the bottom plate is permitted to glide smoothly over the support 9 to and from dumping position. The front frame support 9a, which functions as a fulcrum for the bottom plate, is positioned relative to the plate inwardly a distance sufficient to sharply downwardly pitch the plate when urged outwardly beyond support 9.

In large capacity cars, to urge the movable car members to dumping position, a hydraulic ram, such as the one illustrated at 35 is preferable. Such a ram is pivotally connected to the underside of the bottom plate 21 at a point 36, equidistant from the end margins of the bottom plate 21 but closer to the rear than to the front margin of the plate 21, in order to elevate the rear portion of the plate. The ram 35 is of the telescopic type and includes oil lines 37, which connect to a source of power (not shown). The rear end of the ram may be mounted to the car frame as at 39. While the urging means illustrated herein is a hydraulic ram, it will be understood that in smaller cars any suitable manually operable, positive actuating means may be employed.

The front wall 19 and rear wall 17 are preferably linked together for simultaneous, substantially parallel movement, and a suitable linkage arrangement is provided by levers 41 and 43 mounted at their upper ends for arcuate movement to the front and rear wall pivotal connections. These levers are interlinked at their lower ends by pivotally connected common link 45. Lever 41 has a horizontal portion 47 integral with a vertical portion 49. As is obvious, the horizontal portion 47 will abut the top of rib 15a to limit the movement of the front wall 19 as well as interconnected rear wall 17 and bottom plate 21 when these are returned to normal position from discharge position. The vertical portion 49, secured to front wall 19, has attached to it a substantially V-shaped bracket 51, pivotally connected at its opposite end to link 45.

In operation, when the hydraulic ram is extended, the bottom 21 moves to a downwardly inclining position beyond the car frame and the bottom end of the hinged rear wall is elevated to a position coplanar to the bottom. Simultaneously, the bottom of the front wall elevates to form an opening for discharge of the car contents to the dump area. The end plates, being rigidly secured to the frame, serve to counterbalance the shifting center of gravity of the car while the bottom plate glides smoothly over the rollers 29 mounted on the fulcrum portion of the car frame. Inward movement of the rear wall functions to extend the bottom plate outwardly beyond the wheels of the car approximately thirty (30) inches permitting the railroad tracks to be located substantially inward from the edge of the precipice on relatively firm or stable ground.

While the bottom of the rear wall and the rear of the bottom plate are elevating to dumping position, any caking or "build up" of material, which has formed between the bottom plate and rear wall when disposed normal to one another, is immediately loosened or broken up insuring a "clean" or thorough discharge of material from the car bed. As is obvious, since the car is ram actuated, the operator can control the rate of movement of the movable parts and prevent a sudden shifting of the center of gravity. Additionally, whether the ram is operated by a manually-actuated crank or by fully-mechanical means, a definite and positive force must be used to elevate the bottom plate when it is supporting a load; and therefore, accidental premature discharge of the car contents is virtually impossible.

When it is desired to return the car to normal position, the action of the ram may be reversed. The bottom plate is then pulled up over rollers 31 to horizontal position on the frame. This movement allows the rear wall and interconnected front wall to move downwardly and normal to the bottom plate.

Referring now to FIG. 4, the foregoing described equipment is modified. Here is illustrated how this invention may be adapted for operation with road vehicles where it is desirable to discharge the load from the rear rather than the side of the vehicle. Corresponding reference numerals are used for corresponding parts, and description thereof is not repeated herein. A mechanical or hydraulic ram (not shown) may be used to move the bottom plate 21 to downwardly inclining position thereby causing interconnected rear wall 17 and front wall 19 to move to dumping position as heretofore described.

Although the foregoing invention has been described in some detail by way of illustration and example for purposes of clarity of understanding, it is understood that certain changes and modifications may be practiced within the spirit of the invention and scope of the appended claims.

What is claimed is:

1. In a dumping car, the combination of: a frame, a bottom plate; bearing means for said bottom plate associated with said frame; support means other than said bearing means for said bottom plate under said bottom plate; first and second unslotted end walls fixed to said support means; first and second side walls; means pivotally mounting said side walls on said end walls from a position adjacent the upper portion of said side walls for respective inward and outward movement relative thereto; said bottom plate being pivotally mounted on the bottom of said first side wall and movable to a position laterally beyond said support means; means to urge said bottom plate laterally beyond said support means while urging said first side wall inwardly whereby said first side wall and bottom plate form an inclined slide; and means interconnecting said two side walls entirely exteriorly of said side walls and end walls to simultaneously urge said second side wall outwardly when said first side wall is urged inwardly.

2. In a dumping car, the combination of: a frame, a bottom plate; bearing means for said bottom plate associated with said frame; support means other than said bearing means for said bottom plate under said bottom plate; first and second unslotted end walls fixed to said support means; a first side wall pivotally mounted on said end walls from a position adjacent the upper portion of said side wall for inward movement relative thereto; a second side wall having an inwardly extending horizontal portion at the top; said second side wall pivotally mounted on said end walls by said horizontal portion for outward movement relative to said end walls; said bottom plate being pivotally mounted on the bottom of said first side wall and movable to a position laterally beyond said support means; means to urge said bottom plate laterally beyond said support means while urging said first side wall inwardly whereby said first side wall and bottom plate form an inclined slide; and means interconnecting said two side walls entirely exteriorly of said side walls and end walls to simultaneously urge said second side wall outwardly when said first side wall is urged inwardly; said interconnecting means including a vertical lever connected to the upper portion of said first side wall and a vertical lever connected to the horizontal portion of said second side wall; and a horizontal link pivotally connecting the lower portions of said levers.

References Cited in the file of this patent

UNITED STATES PATENTS

| | | |
|---|---|---|
| 1,188,608 | Barth | June 27, 1916 |
| 1,408,334 | Barth | Feb. 28, 1922 |
| 1,428,131 | Barth | Sept. 5, 1922 |
| 1,579,821 | Kleinhans | Apr. 6, 1926 |
| 1,686,409 | Geuer | Oct. 2, 1928 |
| 1,812,539 | Ludowici | June 30, 1931 |

FOREIGN PATENTS

| | | |
|---|---|---|
| 579,147 | France | July 24, 1924 |
| 397,758 | Germany | July 8, 1924 |
| 145,699 | Great Britain | May 19, 1921 |